3,165,670
MOTOR PROTECTIVE SYSTEM
John Baude, Milwaukee, Wis., assignor to Allis-Chalmers
Manufacturing Company, Milwaukee, Wis.
Filed Jan. 2, 1963, Ser. No. 248,952
11 Claims. (Cl. 317—19)

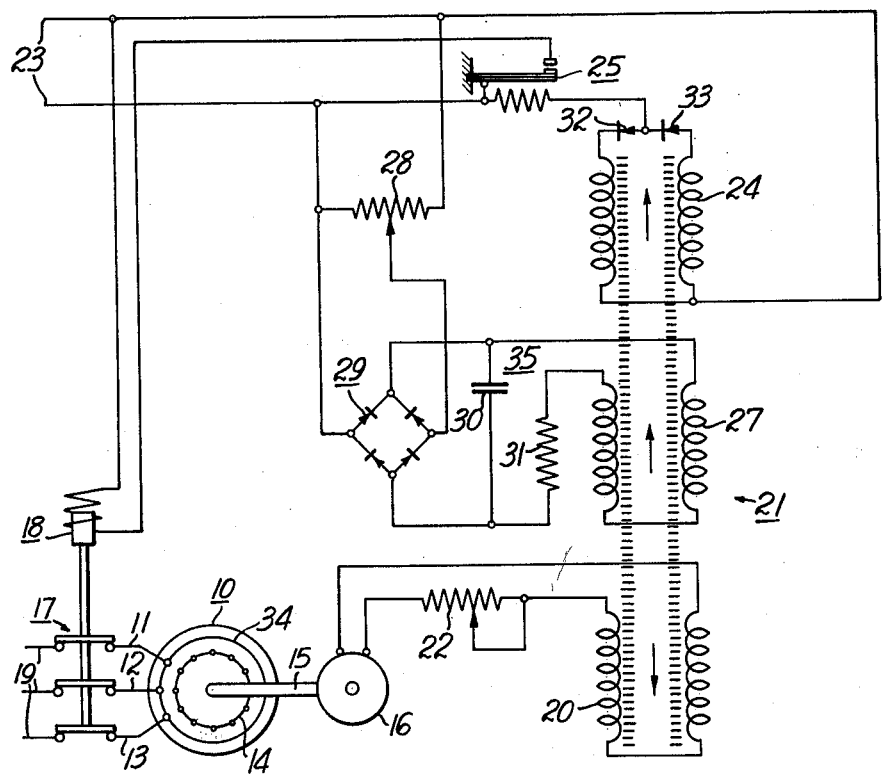

This invention relates generally to devices or systems for protecting a winding of a motor. Particularly, it relates to systems that deenergize a motor to prevent overheating of motor windings that are not readily externally accessible for temperature or current flow checks.

A typical motor having an inaccessible winding is an induction motor with its squirrel cage winding. These windings are not externally connected to any current flow circuits and are not readily accessible for determining the winding temperature. Therefore, it is desirable to provide a system that will indicate when the operating conditions are such that overheating is occurring.

Overheating will occur if such a motor is slowed significantly below its design operating speed. It will overheat at a certain rate depending on its speed and, if it is stopped completely, overheating will occur more rapidly. Failure of the motor to operate at the designed speed occurs because of changes in load conditions or mechanical breakdowns. While the most dangerous time in this regard is during the starting period, the overheating condition may occur at any time. Therefore, a protective system capable of continuous operation is usually necessary.

The heating of the cage winding is a function of the speed of the cage winding relative to the rotation of the stator coil field. With a greater speed difference between the rotating winding and the rotating stator field, the heating effect is greater and at smaller relative speed differences the heating effect on the winding is relatively less. Therefore, any winding protective system or device should adjust for the actual difference and operate so that deenergization of the motor does not occur when it is not necessary.

In a protective system utilizing this invention, a means is provided for deenergizing the stator winding of the motor if the motor speed is consistently slower than the design speed. The system enables selection of the deenergization time at appropriate time-current conditions of the winding so that the maximum potential of the motor may be utilized without danger of overheating.

The objects of this invention are: to provide a new and improved protective system for a motor with an inaccessible winding: to provide a motor winding protective system that is coordinated with the thermal capacity of the motor winding; to provide a motor winding protective system that is easily adaptable and adjustable for use with any motor; and to provide a motor winding proctective system that requires only a small amount of power.

Other objects and advantages of the this invention will appear from the following detailed description.

The figure is a schematic drawing of a protective system embodying this invention.

Referring to the figure, a motor 10 has a stator winding 34, a motor shaft 15, and a rotor winding, such as a squirrel cage winding 14. The motor receives power for producing a rotating stator field through power lines 11, 12 and 13 from an A.C. power source 19. A means, comprising a circuit breaker 17 and a trip coil 18, is provided for deenergizing the motor in response to a tripping signal, such as current passed through trip coil 18.

A means responsive to the speed of rotation of the motor (its rotor and cage winding) is provided for producing an electrical speed signal varying as a function of cage winding speed. This means may be a D.C. current generator connected to shaft 15. In this embodiment a device that produces an electrical output proportional to its speed, such as a tachometer generator 16, is used.

A means for transforming the speed signal into an appropriate electrical output is provided. In this embodiment, it comprises a means for amplifying the electrical speed signal output of tachometer generator 16. This means for amplifying is specifically shown as a magnetic amplifier 21 that produces an output substantially proportional to the cage winding speed or electrical speed signal.

By appropriate selection and adjustment of the magnetic amplifier and tachometer generator, as later explained, the output of the magnetic amplifier is related to the motor speed in a predetermined manner to simulate the overheating characteristic of the winding.

Magnetic amplifier 21 receives the electrical speed signal as an input to control winding 20 and produces an output at an output winding 24. Proper biasing for the magnetic amplifier is introduced into a bias winding 27 from an appropriate power source. In this embodiment an A.C. power source 23 cooperates with a full wave rectifier bridge 29 and a damping circuit 35 to produce the required power for bias winding 27. The damping circuit, which comprises capacitor 30 and resistor 31, functions to absorb any spurious oscillations or harmonics entering the full wave bridge rectifier from power source 23.

Power source 23 also supplies the power for output winding 24. Diodes 32 and 33 are used, as well known in the art, with the output winding of the magnetic amplifier.

A switching means, such as a thermal switch 25, is provided for producing the tripping signal to activate trip coil 18. The thermal switch is connected to receive the amplifier output and close its contacts to deenergize the motor when the thermal switch reaches a rectain temperature. The thermal switch is selected to have a heating or operating characteristic that will, when used with an appropriately controlled current flow, function to energize trip coil 18 just before the motor overheats.

The operating characteristics of the components of this protective system may be selected to conform with the overheating characteristics of the motor. However, in order that the system may be more versatile and readily adaptable for use with different motors under different conditions, means are provided for controlling and adjusting the amplifier output. In the embodiment shown, this means comprises (1) a means, such as a potentiometer 22, for adjusting the electrical speed signal to control winding 20; and (2) means, such as a potentiometer 28, for adjusting the bias on bias winding 28. These two means are adjusted and the thermal switch and tachometer generator selected so that their combined operational characteristics cooperate to produce a deenergization or tripping characteristic that will deenergize the motor just before it becomes dangerously overheated. This may be accomplished, in a manner well known in the art, by determining the oveheating characteristic curve of the winding to be protected and designing and adjusting the protective system, as previously explained, to produce the tripping signal at a preselected time-current level that is integrated with the time-current level producing overheating of the winding. This time-current characteristic is often called an inverse time-current value or function.

In the operation and adjustment of this embodiment of this invention, the bias winding receives a sufficiently large bias that is great enough to saturate, or nearly saturate, the magnetic amplifier. As well known in the art, a designed minimum impedance will be created in the output winding at the saturation point of the magnetic amplifier. With this minimum impedance the current flow through the output winding and through thermal switch 25 will be relatively large, i.e., at its designed maximum.

Therefore, with no control current flowing into control winding 20, the maximum amount of available electrical current, as furnished by power source 23, will flow through thermal switch 25. With this maximum flow of current, the thermal switch will be heated relatively rapidly to close its contacts and activate coil 18. This condition would only occur when it is completely or nearly completely, stopped.

When the rotor speeds up, tachometer generator 16 produces a relatively increasing electrical speed signal. This signal is applied to control winding 20 in a negative manner relative to the bias current to decrease the saturation of the magnetic amplifier. The degree of saturation is inversely dependent on the rotor speed. And, conversely, the rotor speed decreases, the magnetic flux through the amplifier core increases thereby decreasing the impedance in the output winding. With a decreased impedance in the output winding the flow of current to the thermal switch is increased in a predetermined relationship.

When the motor is operating at design speed, tachometer generator 16 produces a large electrical speed signal which creates a high impedance in the output winding that limits the electrical current flow to the thermal switch. The components are selected and adjusted so that this current is not sufficient to heat thermal switch 25 sufficiently to close its contacts. Thus, the tachometer generator can be kept connected to the motor to produce a continuous output and furnish continuous protection.

It is apparent that the preferred embodiment of the invention described is not the only one encompassed by this invention. There are many variations and adaptations of the disclosed system that could be used without departing from the spirit and scope of the invention.

The embodiments of the invention in which an exclusive property or privilege is claimed are defined as follows:

1. In a motor energizing circuit having a tripping means for deenergizing the motor in response to a tripping signal, a protective system for the motor comprising: means responsive to the speed of the motor for producing an electrical speed signal varying as a function of motor speed; means for transforming the speed signal into an electrical output; and means connected to the tripping means and to the transforming means for producing the tripping signal at a preselected time-current level of the electrical output.

2. In a motor energizing circuit having a tripping means for deenergizing the motor in response to a tripping signal, a protective system for the motor comprising: means responsive to the speed of the motor for producing an electrical speed signal varying as a function of motor speed; means for transforming the speed signal into an electrical output; and means connected to the tripping means and to the transforming means for producing the tripping signal at a time-current level of the output that is integrated with a predetermined time-current level of the current flow through the motor.

3. In a motor energizing circuit having a tripping means for deenergizing the motor in response to a tripping signal, a protective system for a winding of the motor comprising: means responsive to the speed of rotation of the winding for producing an electrical speed signal varying as a function of winding speed; means for amplifying the speed signal to produce an electrical output; and means connected to the tripping means and to the amplifying means for producing the tripping signal at a preselected time-current output.

4. In a motor energizing circuit having a tripping means for deenergizing the motor in response to a tripping signal, a protective system for a winding of the motor comprising: means responsive to the speed of rotation of the winding for producing an electrical speed signal varying as a function of the winding speed; amplifying means connected to receive the speed signal for producing an output inversely proportional to the winding speed; and means connected to the tripping means and to the amplifying means for producing the tripping signal when said amplifying means output approximates an inverse time-current value that conforms to the overheating characteristic of the winding.

5. In a motor energizing circuit having a tripping means for deenergizing the motor in response to a tripping signal, a protective system for a winding of the motor comprising: means responsive to the speed of rotation of the winding for producing an electrical speed signal proportional to the winding speed; amplifying means connected to receive the speed signal for producing an output inversely proportional to the speed signal; and means connected to the tripping means and to the amplifying means for producing the tripping signal when said amplifying means output approximates an inverse current-time value that conforms to the overheating characteristic of the winding.

6. In a motor energizing circuit having a tripping means for deenergizing the motor in response to a tripping signal, a protective system for a winding of the motor comprising: a means connected to rotate with the winding for producing an electrical speed signal proportional to the speed of the winding; amplifying means receiving the speed signal for producing an output inversely proportional to the speed signal; and a thermal switch connected to receive the amplified output for producing the tripping signal and connected to the tripping means whereby the operational characteristic of the thermal switch and the output characteristic of the amplifying means cooperate to produce a deenergization characteristic conforming wth the overheating characteristic of the winding.

7. In a motor energizing circuit having a tripping means for deenergizing the motor in response to a tripping signal, a protective system for a winding of the motor comprising: means connected to rotate with the winding for producing an electrical speed signal varying as a function of the winding speed; a magnetic amplifier receiving the speed signal for producing an output inversely proportional to the winding speed; and switching means connected to receive the amplifier output for producing the tripping signal and connected to the tripping means whereby the operational characteristic of the switching means and the output characteristic of the magnetic amplifier cooperate to produce a tripping characteristic conforming with the heating characteristic of the winding.

8. In a motor energizing circuit having a tripping means for deenergizing the motor in response to a tripping signal, a protective system for a winding of the motor comprising: a generator tachometer connected to rotate with the winding for producing an electrical speed signal proportional to the speed of the winding; amplifying means receiving the speed signal for producing an amplified output inversely proportional to the speed signal; and switching means connected to receive the amplified output for producing the tripping signal and connected to the tripping means whereby the operational characteristic of the switching means and the output characteristic of the amplifying means cooperate to produce a tripping characteristic conforming with the overheating characteristic of the winding.

9. In a motor energizing circuit having a tripping means for deenergizing the motor in response to a tripping signal, a protective system for a winding of the motor comprising: means connected to rotate with the winding for producing an electrical speed signal proportional to the speed of the winding; a magnetic amplifier receiving the speed signal as an input and biased to produce an amplified output inversely proportional to the input speed signal; means for adjusting the speed signal input and the bias to control the magnetic amplifier output characteristic; and switching means responsive to the amplifier output for producing the tripping signal and connected to the tripping means whereby the operational characteristic of the switching means and the controlled output characteristic of the magnetic amplifier cooperate to produce a tripping characteristic conforming with the overheating characteristic of the winding.

10. In an induction motor energizing circuit having a tripping means for deenergizing the motor in response to a tripping signal, a protective system for a cage winding of the motor comprising: a generator tachometer connected to rotate with the cage winding for producing an electrical speed signal proportional to the speed of the cage winding; a magnetic amplifier receiving the speed signal as an input and biased to produce an amplified output inversely proportional to the input speed signal; means for adjusting the speed signal input and the bias to control the magnetic amplifier output characteristic; and a thermal switch responsive to the amplified output for producing the tripping signal, and connected to the tripping means whereby the operational characteristic of the thermal switch and the controlled output characteristic of the magnetic amplifier cooperate to produce a deenergization characteristic conforming with the overheating characteristic of the cage winding.

11. In a motor energizing circuit having a tripping means for deenergizing the motor in response to a tripping signal, a protective system for a winding of the motor comprising: means connected to rotate with the winding for producing an electrical speed signal proportional to the speed of the winding; a magnetic amplifier receiving the speed signal as an input and negatively biased relative to the speed signal to saturate the magnetic amplifier when the speed signal is zero; a variable resistance connected to adjust the speed signal input to the magnetic amplifier; a variable resistance connected to adjust the bias to control the magnetic amplifier output characteristic; and switching means responsive to the amplifier output for producing the tripping signal and connected to the tripping means whereby the operational characteristic of the switching means and the controlled output characteristic of the magnetic amplifier cooperate to produce a tripping characteristic conforming with the overheating characteristic of the winding.

No references cited.